United States Patent [19]
Hagimoto et al.

[11] Patent Number: 5,565,942
[45] Date of Patent: Oct. 15, 1996

[54] CAMERA WITH BUILT-IN FLASH

[75] Inventors: Michiko Hagimoto, Kashihara, Japan; Michihiro Iwata, Ridgewood, N.J.

[73] Assignee: Minolta Co., Ltd., Osaka, Japan

[21] Appl. No.: 360,037

[22] Filed: Dec. 20, 1994

[30] Foreign Application Priority Data

Dec. 22, 1993 [JP] Japan ................................ 5-323838

[51] Int. Cl.⁶ .................................................. G03B 15/03
[52] U.S. Cl. ............................................................ 396/177
[58] Field of Search ................................ 354/149.11, 288

[56] References Cited

U.S. PATENT DOCUMENTS 5,107,287  4/1992  Swayze .
5,276,474  1/1994  Dassero et al. .

FOREIGN PATENT DOCUMENTS 58-159526  10/1983  Japan .
59-38429   3/1984   Japan .
59-79232   5/1984   Japan .
60-51540   4/1985   Japan .
3-18518    2/1991   Japan .

*Primary Examiner*—David M. Gray
*Attorney, Agent, or Firm*—Burns, Doane, Swecker & Mathis, LLP

[57] ABSTRACT

An electronic flash device, included in a compact camera whose flash-emitting part having a xenon tube is displaceable between a projecting position at which the flash-emitting part projects from a cover of the camera and a housing position at which the flash-emitting part is housed inside the cover thereof, for ensuring enough distance between a photographing lens and the flash-emitting part to prevent an occurrence of "red-eye phenomenon" upon photographing. In the cover which slides sideways with respect to a main body of the camera, is mounted the flash-emitting part and a spring which biases the flash-emitting part to the projecting position. A cam plate is installed on the main body while a cam follower, driven by the cam plate, for moving the flash-emitting part between the projecting and housing position, is mounted by a pivot in the cover so that the flash-emitting part is moved to the projecting position when the cover is slid open whereas the flash-emitting part is moved to the housing position when the cover is closed.

19 Claims, 5 Drawing Sheets

CAMERA WITH BUILT-IN FLASH

BACKGROUND OF THE INVENTION

1. Field of the Invention

The present invention relates to a camera having a built-in electronic flash, and particularly relates to the mechanism in which a flash-emitting part of the electronic flash is displaceable between a housing position at which the flash-emitting part is housed inside a camera body at time of no picture-taking and a projecting position at which the flash-emitting part projects from the camera body at time of picture-taking.

2. Description of the Related Art

A conventional compact camera having a built-in electronic flash is so constructed that a flash-emitting part of the electronic flash is displaceable between a housing position at which the flash-emitting part is housed inside a body of the camera at time of no picture-taking and a projecting position at which the flash-emitting part projects outwardly from the camera body at time of picture-taking, and that the flash-emitting part is moved away from a photographing lens of the camera at the time of picture-taking in order to prevent an occurrence of "red-eye phenomenon".

For example, in Japanese Laid-Open Utility Model Publication No. 59-38429 is presented a camera whose viewfinder and photographing lens, both covered with a protector member, are exposed outwardly and whose electric power for a flash-emitting part of the electronic flash is switched on, when the flash-emitting part thereof is displaced to its projecting position; in Japanese Laid-Open Utility Model Publication No. 58-159526 is presented a camera whose opening/closing operation of a slide cover for shielding the front surface of the optical system of the camera is performed, linking with a flash-emitting part of the electronic flash being displaced between a housing position at which the flash-emitting part is housed inside the camera body at time of nonuse of the electronic flash and a projecting position at which the flash-emitting part projects upwards from the camera body at time of use of the electronic flash; in Japanese Laid-Open Patent Publication No. 59-79232 is presented a camera whose shielding operation of a slide cover for shielding the front surface of a photographing lens and a viewfinder is performed, interlocking with a flash-emitting part of the electronic flash displacing from a position at which the flash-emitting part projects from the camera body to a position at which the flash-emitting part is housed inside the camera body; in Japanese Laid-Open Utility Model Publication No. 60-51540 is presented a camera having a slide cover, displaceable between a covering position at which the photographing lens is covered with the slide cover and an uncovering position at which the lens is uncovered and exposed outwardly, in which a flash-emitting part of the electronic flash and a viewfinder are mounted; and in Japanese Laid-Open Utility Model Publication No. 3-18518 is presented a camera whose opening/closing operation of a lens barrier is performed, linking with a flash-emitting part of the electronic flash displacing between a projecting position at which the flash-emitting part thereof projects from the camera body and a housing position at which the flash-emitting part thereof is housed inside the camera body.

All the cameras disclosed in the above publications are so constructed that the flash-emitting part of the electronic flash is displaced either upwards or sideways with respect to the camera body to move the flash-emitting part thereof away from the photographing lens, for preventing the occurrence of the red-eye phenomenon upon photographing. The conventional mechanism is, however, not enough to prevent the occurrence of the red-eye phenomenon successfully, because it is inevitably difficult to secure a greater displacement of the flash-emitting part relative to the photographing lens in case of the camera designed compact or small-sized; in other words, the electronic flash to move the flash-emitting part away from the photographing lens would be unavoidably complicated if it is intended to realize such a greater displacement thereof with a compact camera.

SUMMARY OF THE INVENTION

Accordingly, one object of the present invention is to provide a compact camera having a built-in electronic flash which enables a flash-emitting part of the electronic flash to secure a greater displacement with respect to the photographing lens upon photographing, in order to surely prevent the occurrence of the red-eye phenomenon.

Another object of the present invention is to prevent the flash-emitting part of the electronic flash from being damaged, scratched or soiled when a user carries the camera.

Still another object of the present invention is to provide the electronic flash which needs no electric power for driving the flash-emitting part.

In accomplishing these and other objects of the present invention, there is provided a camera comprising: a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered; and a flash-emitting part which is movably supported on the cover so that the flash-emitting part moves in a second direction, substantially perpendicular to both the first direction and the optical axis of the lens, between a housing position at which the flash-emitting part is housed inside the cover and a projecting position at which the flash-emitting part projects from the cover.

According to this mechanism, because the flash-emitting part moves not only with respect to the main body, but also with respect to the cover itself; that is, the flash-emitting part moves in the first direction together with the cover when the cover moves from the covering position to the uncovering position, and the flash-emitting part also moves from the housing position to the projecting position in the second direction perpendicular to both the first direction and the optical axis of the lens, a greater distance between the lens and the flash-emitting part which is set to the projecting position with the cover being set to the uncovering position is realized than the distance reached by the conventional art. In other words, because the flash-emitting part of the conventional camera moves only in one direction corresponding to the first or second direction, it is not possible to realize the distance reached by the present invention. Consequently, the occurrence of the red-eye phenomenon upon flashing is more efficiently prevented than the conventional camera, even if the camera is designed compact or small-sized.

In stead of the above mechanism, the flash-emitting part can be movably supported on the cover so that the flash-emitting part moves in the first direction between a housing position at which the flash-emitting part is housed inside the cover and a projecting position at which the flash-emitting part projects from the cover.

According to this mechanism, because the flash-emitting part projects from the cover in the first direction, the distance between the flash-emitting part and the lens is greater by an extra distance corresponding to a predetermined projecting length of the flash-emitting part than the distance realized by the conventional art, when the cover is set to the uncovering position with the flash-emitting part being set to the projecting position. Consequently, the occurrence of the red-eye phenomenon upon flashing is more efficiently prevented than the conventional camera.

In stead of the above mechanism, the flash-emitting part can be rotatably supported on the cover with a pivot extending substantially parallel to the optical axis of the lens so that the flash-emitting part rotates between a housing position at which the flash-emitting part is housed inside the cover and a projecting position at which the flash-emitting part projects from the cover.

According to this mechanism, because the flash-emitting part projects from the cover as the flash-emitting part is rotated with respect to the cover, the distance between the flash-emitting part and the lens is greater by an extra distance corresponding to a length of the flash-emitting part projecting from the cover than the distance realized by the conventional art, when the cover is set to the uncovering position with the flash-emitting part being set to the projecting position. Consequently, the occurrence of the red-eye phenomenon upon flashing is more efficiently prevented than the conventional camera.

Preferably, the flash-emitting part or the pivot with which the flash-emitting part is rotatably supported on the cover, is arranged on a corner part of the cover which corresponds to a corner part of the main body when the cover moves to the covering position.

With this mechanism, it is realized to secure the greatest distance between the optical axis of the lens and the flash-emitting part when the cover moves to the uncovering position and the flash-emitting part moves to the projecting position.

Preferably, the flash-emitting part is set to the housing position when the cover is set to the covering position, and the flash-emitting part is set to the projecting position when the cover is set to the uncovering position.

With this mechanism, it is realized to prevent the flash-emitting part from being damaged, scratched or soiled at time of nonuse of the camera.

Preferably, the camera is provided with a driving mechanism which drives the flash-emitting part from the housing position to the projecting position, in association with the cover moving from the covering position to the uncovering position and which drives the flash-emitting part from the projecting position to the housing position, in association with the cover moving from the uncovering position to the covering position.

With this mechanism, the setting of the flash-emitting part between the housing position and the projecting position is automatically carried out, followed by a user's manual operation for opening/closing the cover of the camera; therefore, there is no need of an electric power specially supplied for driving the flash-emitting part, which devotes itself to the economy of the electric power.

In order to make the flash-emitting part move in association with the sliding movement of the cover with respect to the main body, for example, the driving mechanism comprises a cam provided on the main body, and a cam follower provided in the cover and driven by the cam, the cam and the cam follower cooperating to convert a force to move the cover between the covering position and the uncovering position to a force to move the flash-emitting part between the housing position and the projecting position. In this construction, the cam and the cam follower may be provided on the corner parts of the main body and the cover, respectively.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE INVENTION

Figure 1:
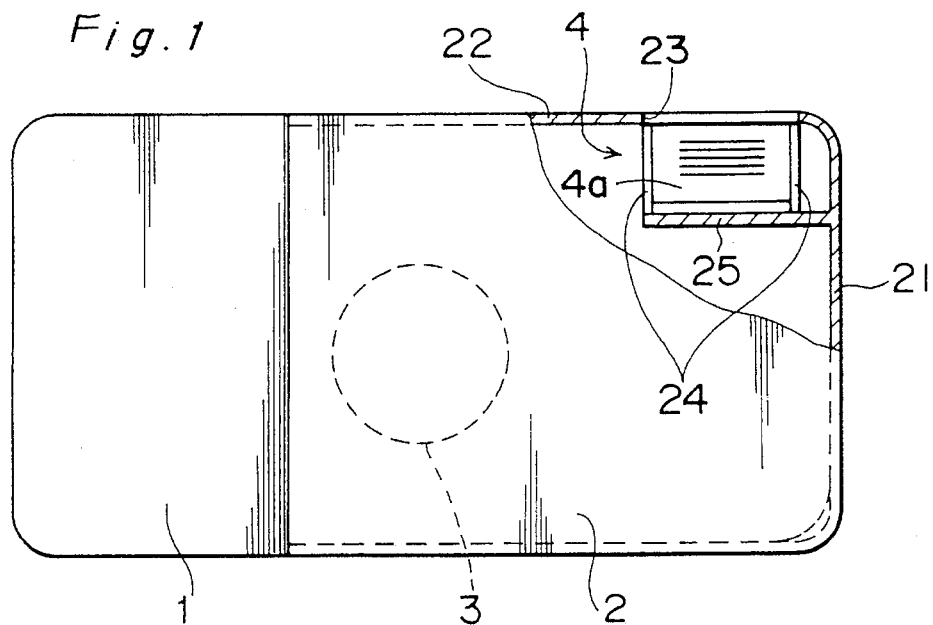
FIG. 1 is a partially sectional, front view of a camera, having a built-in electronic flash device according to a first embodiment of the present invention, with its cover being set to a covering position and its flash-emitting part being set to a housing position.

Before the description of the present invention proceeds, it is to be noted that like or corresponding parts are designated by like reference numerals throughout the accompanying drawings.

Referring to FIGS. 1–10, a full description of a camera with a built-in electronic flash device according to a first, second and third embodiment of the present invention is given below. In this connection, the electronic flash device is applied to a camera, having a leaf shutter, whose lens barrel is accommodated permanently inside a main body of the camera and the lens barrel does not project outwardly from the main body.

Firstly, a description of a camera with a built-in electronic flash device according to the first embodiment is given below, with reference to FIGS. 1–6.

Figure 2:
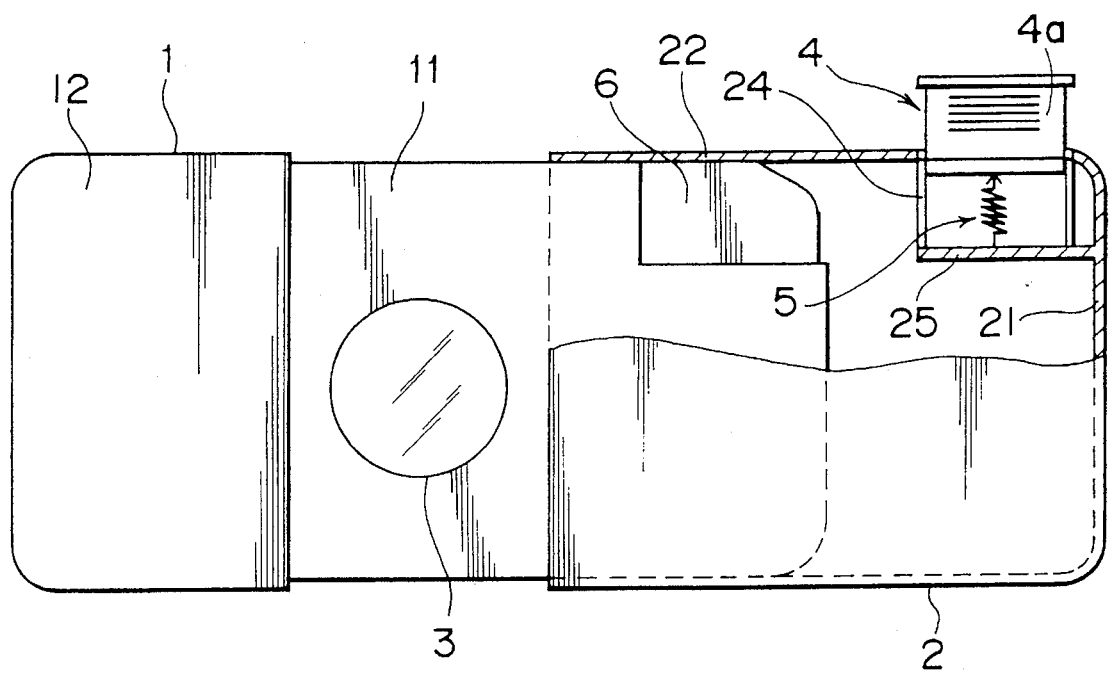
FIG. 2 is a view, similar to FIG. 1, of the camera with its cover being set to an uncovering position and its flash-emitting part being set to a projecting position.

As shown in FIGS. 1 and 2, the camera has the main body 1 and a cover 2, and the cover 2 is slidably supported by the main body 1 so that the cover 2 moves between a covering position (shown in FIG. 1) at which a photographing lens 3 is covered with the cover 2 and an uncovering position (shown in FIG. 2), located sideways to the right of the covering position in FIG. 1, at which the lens 3 is uncovered and exposed outwardly. The cover 2 is formed as a tubular, four-cornered box, one end of which is closed with its end wall 21 and the other end of which is open. Meanwhile, the main body 1 of the camera has a first part 11 which has an external configuration formed a bit smaller than the internal dimension of the cover 2 so that the first part 11 is covered with the cover 2 when the cover 2 is slid to the housing position, and a second part 12 whose outer dimension and external shape are formed similar to those of the cover 2 so that the outer surface of the second part 12 is matched with the outer surface of the cover 2 when the cover 2 is slid to the covering position, the second part 12 being not covered with the cover 2 even if the cover 2 is slid to the covering position. The photographing lens 3 is located in the first part 11 of the main body 1 as shown in the FIGS. 1 and 2, so that the lens 3 is also covered and protected by the cover 2 when the cover 2 is set to the covering position.

In a corner located between a top wall 22 and the end wall 21 of the cover 2 is provided one part of the electronic flash device 4 which has a flash-emitting part 4a displaceable between a housing position, shown in FIG. 1, at which the flash-emitting part 4a is housed inside the cover 2 and a projecting position, shown in FIG. 2, at which the flash-emitting part 4a projects from the cover 2. The top wall 22 of the cover 2 has a rectangular cutout 23 as shown in FIGS. 1–3, and the electronic flash device 4 has an upper, rectangular wall 41 which has a thickness substantially equal to the thickness of the top wall 22 and which is positioned inside the cutout 23 to form an outer surface level with the outer surface of the top wall 22 when the flash-emitting part 4a is set to the housing position.

Figure 3:
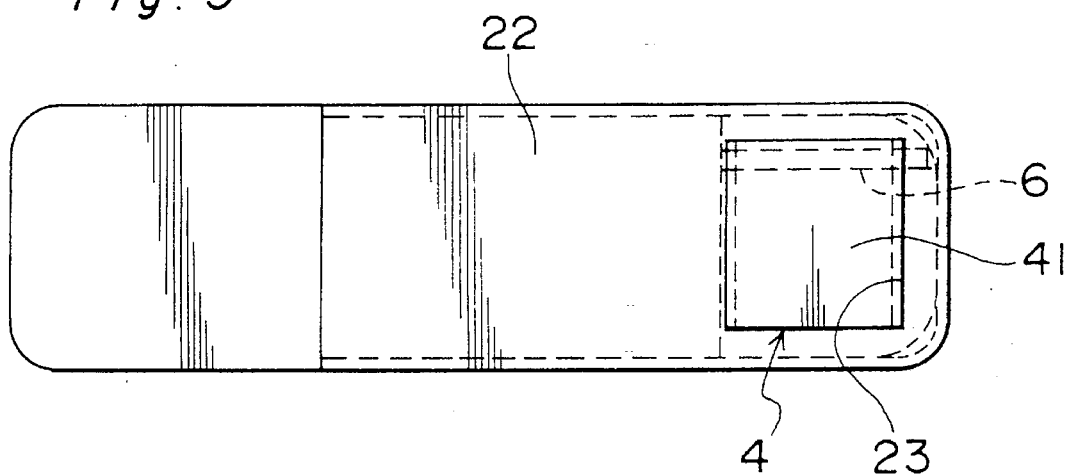
FIG. 3 is a plan view of the camera, shown in FIG. 1, with the cover being set to the covering position.

In this embodiment, as shown in FIG. 3, the rectangular cutout 23 is formed in the top wall 22 with the top wall 22 surrounding the cutout 23 all around in the corner. Instead, it is also possible to form the rectangular cutout in the top wall so that the top wall surrounds the cutout only in three directions, not all around, in the corner. With this construction, for example, a back surface of the flash-emitting part 4a may be permanently exposed outwardly on the back side of the cover.

Figure 5:
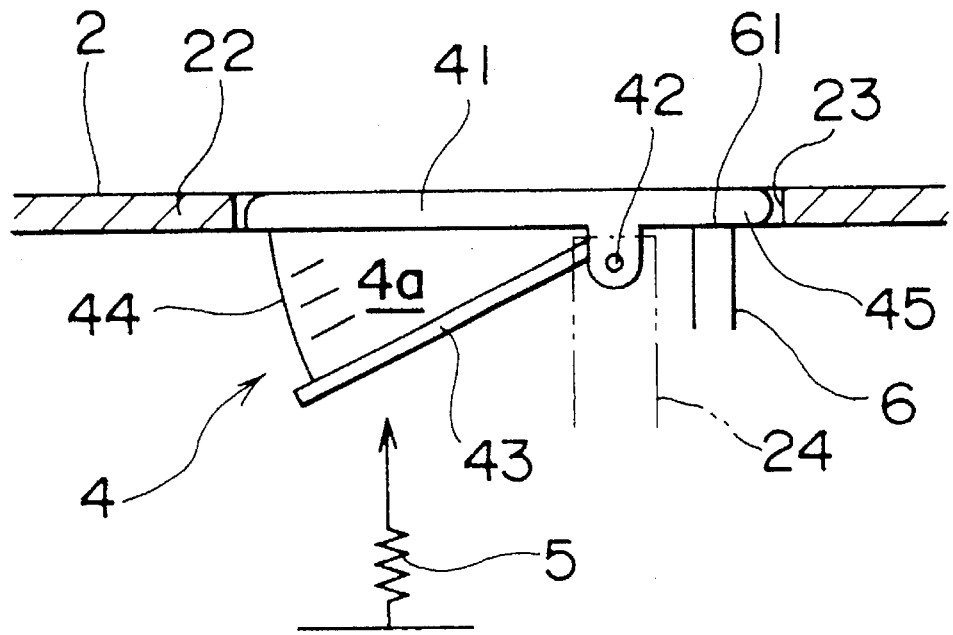
FIG. 5 is an operational, explanatory side view, corresponding to FIG. 1, to show that the flash-emitting part of the built-in electronic flash device is housed inside the cover of the camera.
Figure 6:
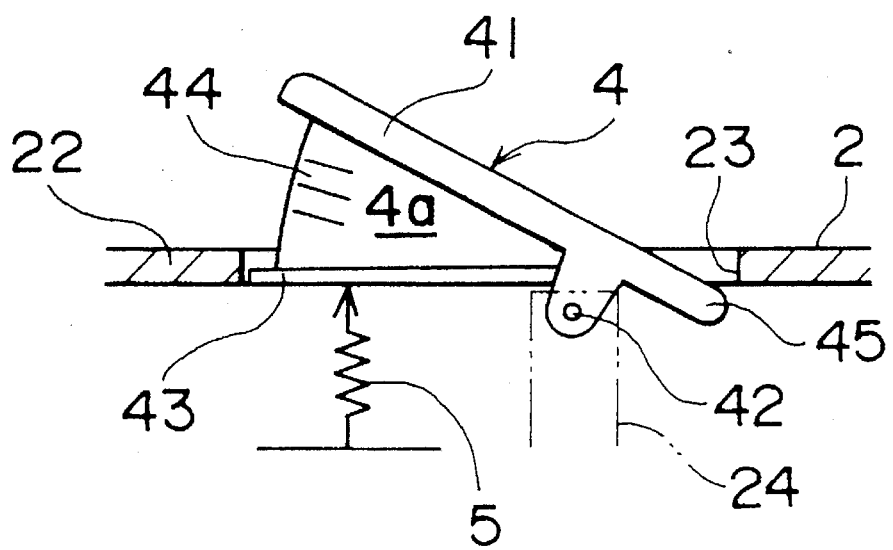
FIG. 6 is an operational, explanatory side view, corresponding to FIG. 2, to show that the flash-emitting part thereof projects outwardly from the cover of the camera.

As shown in FIGS. 5 and 6, the upper wall 41 has a pivot 42 extending in lateral direction on the inner side thereof, and a lower wall 43, extending aslant downwards relative to the upper wall 41, is fixed to the upper wall 41 via the pivot 42. The flash-emitted part 4a has a xenon tube not shown in the figure and a cover lens 44 covering the xenon tube, and the cover lens 44 is sandwiched between the upper wall 41 and the lower wall 43 with the cover lens 44 being fixed to both walls 41 and 43.

The cover 2 has a bearing part 24, shown by a chain line in FIGS. 5 and 6, for rotatably supporting the pivot 42 of the upper wall 41, and the bearing part 24 is mounted on a base 25 which extends inwardly from the end wall 21 of the cover 2, as shown in FIGS. 1 and 2. On this base 25, a coiled-spring 5 as means for biasing the flash-emitting part 4a upwardly to the projecting position is mounted on a front side relative to the pivot 42. In FIGS. 5 and 6, an arrow shows a direction biased by the coiled-spring 5, explanatorily.

Figure 4:
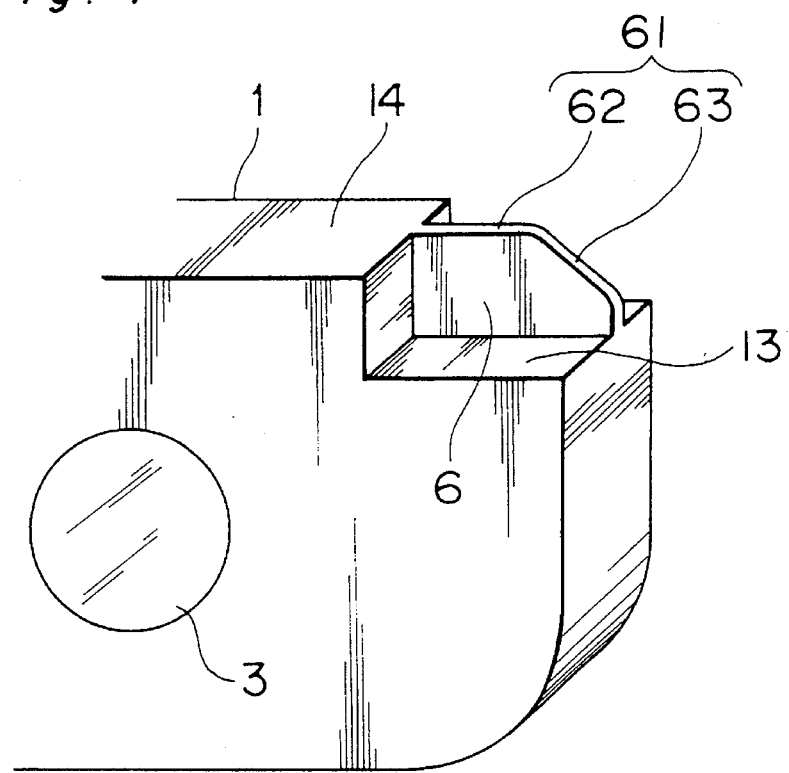
FIG. 4 is a segmental, perspective view of a main body of the camera shown in FIG. 1.

As shown in FIG. 4, in a corner of the main body 1 of the camera is provided the other part of the mechanism for flashing 4, corresponding to and cooperating with the above-mentioned one part of the mechanism for flashing 4. That is, the main body 1 has a concave part 13 at the upper, right corner with respect to the figure, and on the concave part 13 is installed a cam plate 6 with a cam surface 61, for controlling the movement of the upper wall 41 of the cover 2, which has a first guide surface 62 and a second guide surface 63. That is, a part of the upper wall 41 opposite the cover lens 44 with respect to the pivot 42 functions as a cam follower 45, for moving the flash-emitting part 4a between the housing position (as shown in FIGS. 1 and 5) and the projecting position (as shown in FIGS. 2 and 6), which follows the profile of the first and second guide surfaces 62 and 63 of the cam plate 6. The cam plate 6 is formed in a plate-like, substantially rectangular shape, and the first guide surface 62 is formed level with an outer surface of a top wall 14 of the main body 1 while the second guide surface 63 is formed by chamfering a corner portion (at an upper, right position in FIG. 4) of the cam plate 6. Because the first guide surface 62 of the cam plate 6 is formed level with the outer surface of the top wall 14 of the main body 1, and because the thickness of the upper wall 41 is substantially equal to the thickness of the top wall 22, the flash-emitting part 4a of the electronic flash device 4 is sure to be housed inside the cover 2 when the cover 2 is set to the covering position, as shown in FIG. 5.

With this mechanism, as the cover 2 is being displaced from the covering position to the uncovering position, the cam follower 45 of the upper wall 41 is moving away from the first guide surface 62 to the second guide surface 63 of the cam plate 6. And, as the cam follower 45 starts following the second guide surface 63, the flash-emitting part 4a starts projecting outwardly from the top wall 22 of the cover 2, and when the cam follower 45 parts from the second guide surface 63, the flash-emitting part 4a is set to the projecting position as shown in FIGS. 2 and 6. At this time, it is possible to take a picture with a flash light. Conversely, as the cover 2 is being displaced from the uncovering position to the covering position, the cam follower 45 of the upper wall 41 starts following the second guide surface 63 after contacting it, the flash-emitting part 4a starting displacing from the projecting position to the housing position. And, as the cam follower 45 contacts the first guide surface 62 of the cam plate 6, the flash-emitting part 4a returns to the housing position as shown in FIGS. 1 and 5.

As apparent from the above description, the camera according to the embodiment has a simple mechanism that the cam plate 6 is provided on the side of the main body 1, and the cam follower 45, for driving the flash-emitting part 4a of the electronic flash device 4 to displace it between the housing position and the projecting position, which is driven by the cam plate 6, is provided on the side of the cover 2 of the camera, so that the flash-emitting part 4a is housed inside the cover 2 when the cover 2 is closed or slid to the covering position, while the flash-emitting part 4a projects outwardly from the cover 2 when the cover 2 is opened or slid to the uncovering position; in other words, with this mechanism, it is possible to design a camera compact and small-sized.

In addition, because the camera according to the embodiment is so constructed that the operation of the electronic flash device 4 is performed, interlocking with the cover 2 sliding with respect to the main body 1, there is no need of a special source for driving the mechanism for flashing 4, thus realizing no extra electric power waste.

In addition, because the camera is so constructed that the cover 2 with the flash-emitting part 4a moves sideways with respect to the main body 1 and that the flash-emitting part 4a projects upwards with respect to the cover 2, when the flash-emitting part 4a thereof is set to the projecting position with the cover 2 being set to the uncovering position, it is possible, in spite that the camera is compact and small-sized, to secure enough distance between the photographing lens 3 and the flash-emitting part 4a thereof, i.e. between the optical axis of the lens 3 and the optical axis of the light beam emitted from the flash-emitting part 4a, to surely prevent the occurrence of the red-eye phenomenon upon flashing for photographing.

In addition, because the camera is so constructed that the flash-emitting part 4a of the electronic flash device 4 is automatically housed inside the cover 2 when the cover 2 is set to the covering position, the flash-emitting part 4a is prevented from being damaged, scratched or soiled when a user carries the camera.

In the camera with the built-in electronic flash device according to the first embodiment, the flash-emitting part thereof is so constructed that it moves not only in a first direction in which the cover moves with respect to the main body, but also in a second direction perpendicular to both the first direction and the optical axis of the lens. It will also be recognized that it is possible to construct the electronic flash device so that the flash-emitting part thereof moves in a first direction, in which the cover moves relative to the main body, not only with respect to the main body, but also with respect to the cover itself, as described below as the second embodiment with reference to FIGS. 7 and 8. And, it will also be appreciated that it is possible to construct the electronic flash device so that the flash-emitting part moves not only in a first direction in which the cover moves relative to the main body, but also in a rotational direction, the axis of whose rotation is substantially parallel to the optical axis of the lens, relative to the cover itself, as described below as the third embodiment with reference to FIGS. 9 and 10. In this connection, the fundamental construction, except the electronic flash device, of the camera according to the second and third embodiments is designed similar to that of the camera according to the first embodiment.

Figure 7:
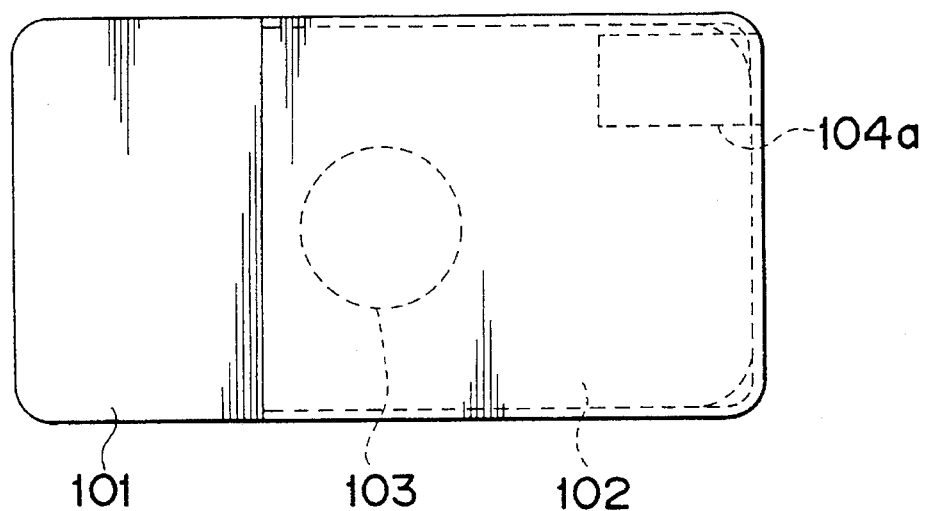
FIG. 7 is an explanatory front view of a camera, having a built-in electronic flash device according to a second embodiment of the present invention, with its cover being set to a covering position and its flash-emitting part being set to a housing position.
Figure 8:
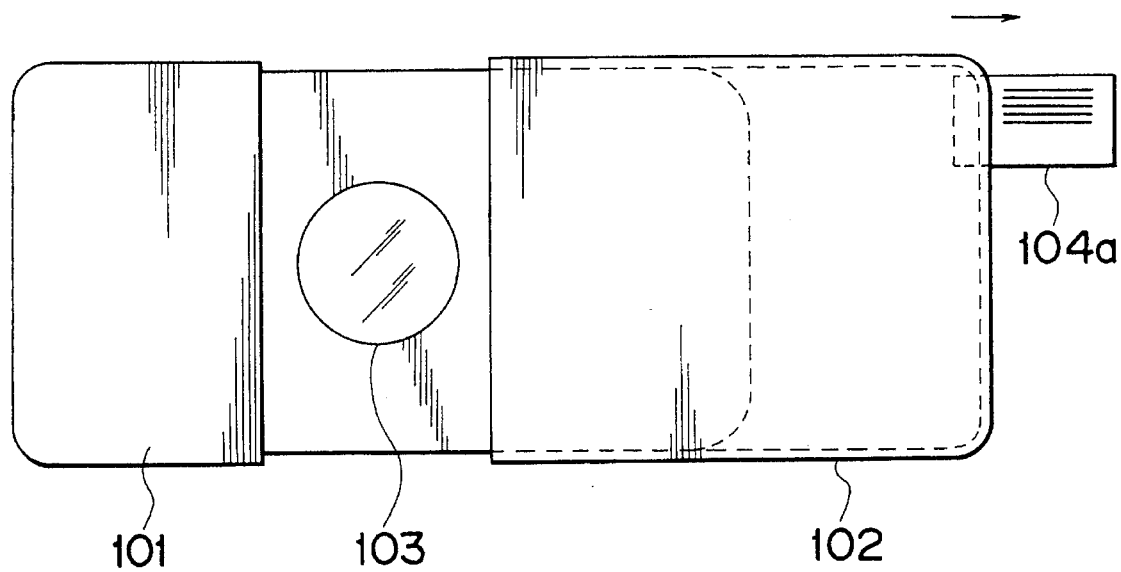
FIG. 8 is an explanatory front view of the camera shown in FIG. 7 with its cover being set to an uncovering position and its flash-emitting part being set to a projecting position.

Namely, the electronic flash device according to the second embodiment has a mechanism with which a flash-emitting part 104a thereof projects outwardly from a corner part of a cover 102 in the direction in which the cover 102 moves relative to a main body 101 having a photographing lens 103 when the cover 102 is slid from the covering position shown in FIG. 7 to the uncovering position shown in FIG. 8. The direction in which the light-emitting part 104a moves when it displaces from the housing position, shown in FIG. 7, at which the flash-emitting part 104a is housed inside the cover 102, to the projecting position, shown in FIG. 8, at which the flash-emitting part 104a projects from the cover 102, is shown by an arrow in FIG. 8.

Figure 9:
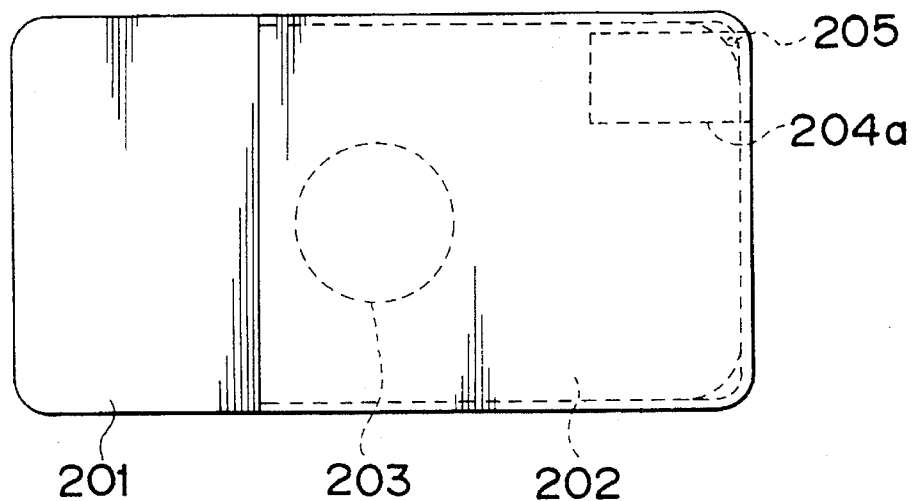
FIG. 9 is an explanatory front view of a camera, having a built-in electronic flash device according to a third embodiment of the present invention, with its cover being set to a covering position and its flash-emitting part being set to a housing position.
Figure 10:
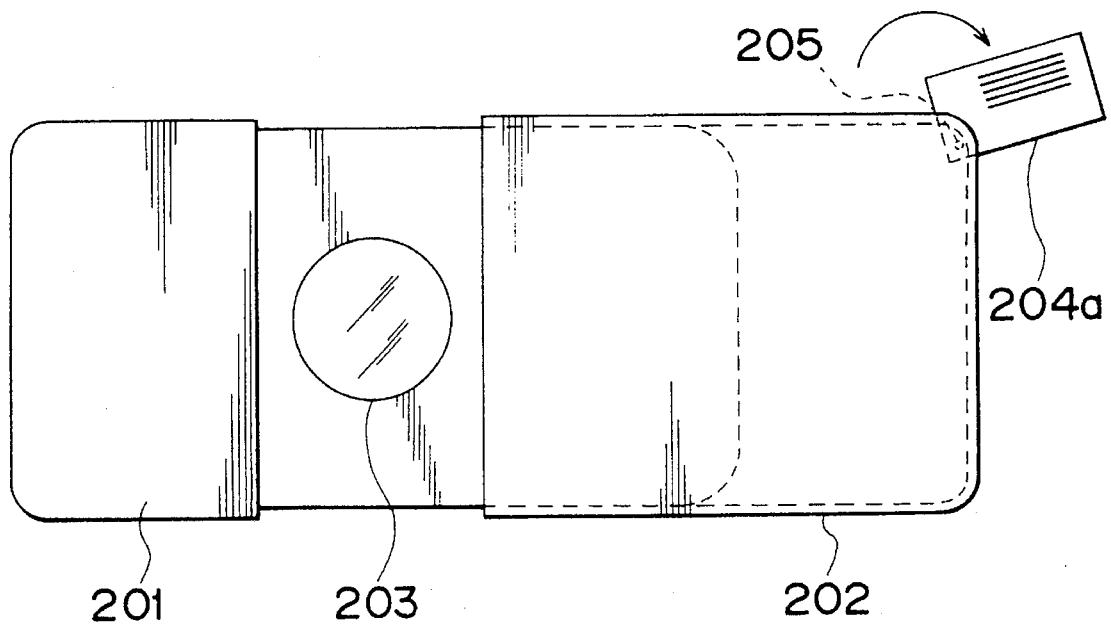
FIG. 10 is an explanatory front view of the camera shown in FIG. 9 with its cover being set to an uncovering position and its flash-emitting part being set to a projecting position.

Meanwhile, the electronic flash device according to the third embodiment has such a mechanism in which a flash-emitting part 204a is rotatably provided on a corner part of a cover 202 with a pivot 205 extending parallel to the optical axis of the photographing lens 203 of the main body 201, that the flash-emitting part 204a rotates to project outwardly from the corner part of the cover 202 when the cover 202 is slid from the covering position shown in FIG. 9 to the uncovering position shown in FIG. 10. The direction in which the light-emitting part 204a moves when it displaces from the housing position, shown in FIG. 9, at which the light-emitting part 204a is housed inside the cover 202, to the projecting position, shown in FIG. 10, at which the light-emitting part 204a projects from the cover 202, is shown by an arrow in FIG. 10. It is preferable that the light-emitting part 204a is so positioned that the light-emitting part 204a as a whole is kept the furthest away from the photographing lens 203 when the light-emitting part 204a is set to the projecting position with the cover 202 being set to the uncovering position, as shown in FIG. 10.

Although the present invention has been fully described in connection with the embodiments thereof with reference to the accompanying drawings, it is to be noted that various changes and modifications thereof are apparent to those skilled in the art.

For example, in connection with the above first and second embodiment, it is also possible to construct the electronic flash device so that its flash-emitting part moves up and down translationally between the housing position and the projecting position, so that the flash-emitting part is set to the housing position when the cover is set to the covering position.

Also, it is possible, for example, to adopt the electronic flash device according to the present invention to a type of a camera whose lens barrel projects from the main body when the cover is opened or slid to the uncovering position.

Such changes and modifications are to be understood as included within the scope of the present invention as defined by the appended claims unless they depart therefrom.

What is claimed is:

1. A camera comprising:

a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered; and a flash-emitting part which is movably supported on the cover so that the flash-emitting part moves in a second direction, substantially perpendicular to both the first direction and the optical axis of the lens, from a housing position at which the flash-emitting pan is housed inside the cover to a projecting position at which the flash-emitting part projects from the cover when the cover moves to the uncovering position.

2. A camera as claimed in claim 1, wherein the flash-emitting part is set to the housing position when the cover is set to the covering position, and the flash-emitting part is set to the projecting position when the cover is set to the uncovering position.

3. A camera as claimed in claim 1, further comprising a driving mechanism for driving the flash-emitting part from the housing position to the projecting position, in association with the cover moving from the covering position to the uncovering position.

4. A camera as claimed in claim 1, further comprising a driving mechanism which drives the flash-emitting part from the housing position to the projecting position, in association with the cover moving from the covering position to the uncovering position and which drives the flash-emitting part from the projecting position to the housing position, in association with the cover moving from the uncovering position to the covering position.

5. A camera as claimed in claim 3, wherein the driving mechanism comprises a cam, provided on the main body, whose cam surface is formed in the first direction, and a cam follower provided on the cover and driven by the cam, the cam and the cam follower cooperating to convert a force to move the cover from the covering position to the uncovering position to a force to move the flash-emitting part from the housing position to the projecting position.

6. A camera as claimed in claim 4, wherein the driving mechanism comprises a cam, provided on the main body, whose cam surface is formed in the first direction, and a cam follower provided on the cover and driven by the cam, the cam and the cam follower cooperating to convert a force to move the cover between the covering position and the uncovering position to a force to move the flash-emitting part between the housing position and the projecting position.

7. A camera as claimed in claim 1, wherein the flash-emitting part is provided on a corner part of the cover which corresponds to a corner part of the main body when the cover moves to the covering position.

8. A camera as claimed in claim 7, further comprising a driving mechanism for driving the flash-emitting part from the housing position to the projecting position, in association with the cover moving from the covering position to the uncovering position.

9. A camera as claimed in claim 7, further comprising a driving mechanism which drives the flash-emitting part from the housing position to the projecting position, in association with the cover moving from the covering position to the uncovering position and which drives the flash-emitting part from the projecting position to the housing position, in association with the cover moving from the uncovering position to the covering position.

10. A camera as claimed in claim 8, wherein the driving mechanism comprises a cam, provided on the corner part of the main body, whose cam surface is formed in the first direction, and a cam follower provided on the corner part of the cover and driven by the cam, the cam and the cam follower cooperating to convert a force to move the cover from the covering position to the uncovering position to a force to move the flash-emitting part from the housing position to the projecting position.

11. A camera as claimed in claim 9, wherein the driving mechanism comprises a cam, provided on the corner part of the main body, whose cam surface is formed in the first direction, and a cam follower provided on the corner part of the cover and driven by the cam, the cam and the cam follower cooperating to convert a force to move the cover between the covering position and the uncovering position to a force to move the flash-emitting part between the housing position and the projecting position.

12. A camera comprising:

a cover which is slidably supported by a main body of the camera so that the cover moves in a direction, substantially perpendicular to an optical axis of a lens, between a covering position at which a from surface of the lens is covered by the cover and an uncovering position at which the from surface of the lens is uncovered; and a flash-emitting part which is movably supported on the cover so that the flash-emitting part moves in the direction from a housing position at which the flash-emitting part is housed inside the cover to a projecting position at which the flash-emitting part projects from the cover when the cover moves to the uncovering position.

13. A camera as claimed in claim 12, wherein the flash-emitting part is provided on a corner part of the cover which corresponds to a corner part of the main body when the cover moves to the covering position.

14. A camera comprising:

a cover which is slidably supported by a main body of the camera so that the cover moves in a direction, substantially perpendicular to an optical axis of a lens, between a covering position at which a from surface of the lens is covered by the cover and an uncovering position at which the front surface of the lens is uncovered; and a flash-emitting part which is rotatably supported on the cover with a pivot extending substantially parallel to the optical axis of the lens so that the flash-emitting part rotates from a housing position at which the flash-emitting part is housed inside the cover to a projecting position at which the flash-emitting part projects from the cover when the cover moves to the uncovering position.

15. A camera as claimed in claim 14, wherein the pivot is provided on a corner part of the cover which corresponds to a corner part of the main body when the cover moves to the covering position.

16. A camera comprising:

a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered;

a flash-emitting part which is movably supported on the cover so that the flash-emitting part moves in a second direction, substantially perpendicular to both the first direction and the optical axis of the lens, between a housing position at which the flash-emitting part is housed inside the cover and a projecting position at which the flash-emitting part projects from the cover;

a driving mechanism for driving the flash-emitting part from the housing position to the projecting position, in association with movement of the cover from the covering position to the uncovering position, wherein the driving mechanism comprises a cam, provided on the main body, whose cam surface is formed in the first direction, and a cam follower provided on the cover and driven by the cam, and wherein the cam and the cam follower cooperate to convert a force to move the cover from the covering position to the uncovering position into a force to move the flash-emitting part from the housing position to the projecting position.

17. A camera comprising:

a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered;

a flash-emitting part which is movably supported on the cover so that the flash-emitting part moves in a second direction, substantially perpendicular to both the first direction and the optical axis of the lens, between a housing position at which the flash-emitting part is housed inside the cover and a projecting position at which the flash-emitting part projects from the cover;

a driving mechanism which drives the flash-emitting part from the housing position to the projecting position, in association with movement of the cover moving from the covering position to the uncovering position, and which drives the flash-emitting part from the projecting position to the housing position, in association with the cover moving from the uncovering position to the covering position, wherein the driving mechanism comprises a cam, provided on the main body, whose cam surface is formed in the first direction, and a cam follower provided on the cover and driven by the cam, and wherein the cam and the cam follower cooperate to convert a force to move the cover between the covering position and the uncovering position into a force to move the flash-emitting part between the housing position and the projecting position.

18. A camera comprising:

a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered;

a flash-emitting part which is movably supported on the cover so that the flash-emitting part moves in a second direction, substantially perpendicular to both the first direction and the optical axis of the lens, between a housing position at which the flash-emitting part is housed inside the cover and a projecting position at which the flash-emitting part projects from the cover, wherein the flash-emitting part is provided on a corner part of the cover which corresponds to a corner part of the main body when the cover moves to the covering position; and a driving mechanism for driving the flash-emitting part from the housing position to the projecting position, in association with the cover moving from the covering position to the uncovering position, wherein the driving mechanism comprises a cam, provided on the corner part of the main body, whose cam surface is formed in the first direction, and a cam follower provided on the corner part of the cover and driven by the cam, and wherein the cam and the cam follower cooperate to convert a force to move the cover from the covering position to the uncovering position into a force to move the flash-emitting part from the housing position to the projecting position.

19. A camera comprising:

a cover which is slidably supported by a main body of the camera so that the cover moves in a first direction, substantially perpendicular to an optical axis of a lens, between a covering position at which a front surface of the lens is covered by the cover and an uncovering position at which the front surface of the lens is uncovered;

a flash-emitting part which is movably supported on the cover so that the flash-emitting part moves in a second direction, substantially perpendicular to both the first direction and the optical axis of the lens, between a housing position at which the flash-emitting part is housed inside the cover and a projecting position at which the flash-emitting part projects from the cover, wherein the flash-emitting part is provided on a corner part of the cover which corresponds to a corner part of the main body when the cover moves to the covering position; and a driving mechanism which drives the flash-emitting part from the housing position to the projecting position, in association with the cover moving from the covering position to the uncovering position, and which drives the flash-emitting part from the projecting position to the housing position, in association with the cover moving from the uncovering position to the covering position, wherein the driving mechanism comprises a cam, provided on the corner part of the main body, whose cam surface is formed in the first direction, and a cam follower provided on the corner part of the cover and driven by the cam, and wherein the cam and the cam follower cooperate to convert a force to move the cover between the covering position and the uncovering position into a force to move the flash-emitting part between the housing position and the projecting position.

\* \* \* \* \*